April 18, 1950     E. M. BARNES ET AL     2,504,624
AUTOMATIC SAFETY THROWOFF MECHANISM
Filed Nov. 29, 1946
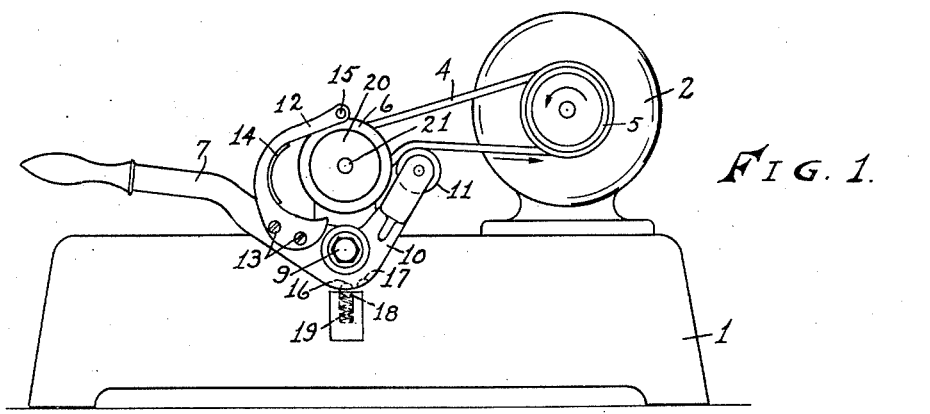
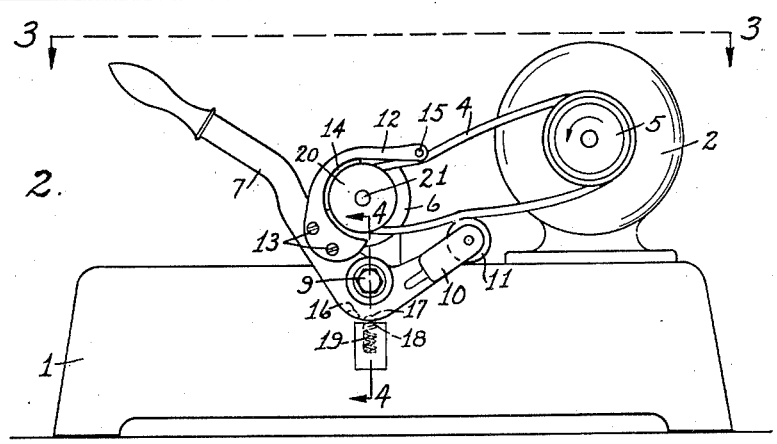
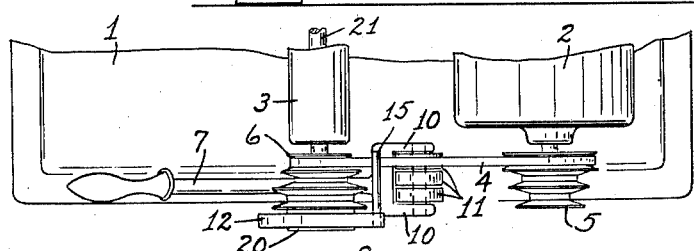
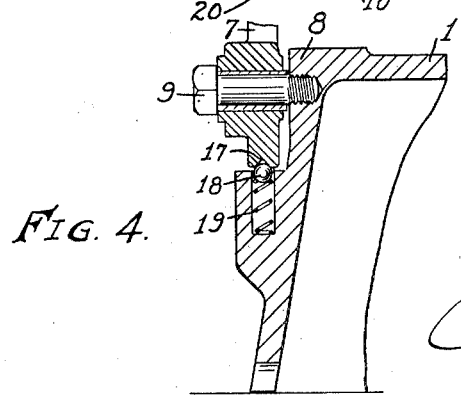
EVERETT M. BARNES
AND
CLARENCE E. BARNES,
INVENTORS.
BY *Donald E. Windle,*
ATTORNEY.

Patented Apr. 18, 1950

2,504,624

UNITED STATES PATENT OFFICE 2,504,624

AUTOMATIC SAFETY THROWOFF MECHANISM

Everett M. Barnes and Clarence E. Barnes, New Paris, Ohio

Application November 29, 1946, Serial No. 712,776

2 Claims. (Cl. 74—242.9)

The mechanism shown in the accompanying drawing and hereinafter described and claimed is adapted to be used in connection with a driving means associated with a driven mechanism, and using a belt as a power transmitting means between the driving means and the driven mechanism.

We are fully aware that throw-off mechanisms and clutches of various types are old in the art, but the conventional types are of a manually-operated type and require constant attention of the operator of the machine in order to interrupt the transmission of power between the driving means and the driven mechanism should the driven mechanism become overloaded.

The principal object of the present invention is the provision of a throw-off mechanism which is entirely automatic in interrupting the transmission of power from a driving means to the driven mechanism.

A second object is the provision of a device comprising means for automatically interrupting transmission of power to a driven mechanism both by automatic and manual means.

A third object is the provision of an automatic throw-off mechanism operating between a driving means and a driven mechanism which permits instant resetting to power-transmitting position by manual means.

Another object of the invention is the provision of an automatic throw-off mechanism which is simple of construction and operation, and which is economical in the production thereof.

A still further object is the provision of a combined automatic throw-off mechanism and a belt-tightening means.

Other objects and particular advantages of the invention will become apparent in the course of the following description, and that which is new will be pointed out in the appended claims.

The preferred, and most satisfactory manner of carrying out the principles of the invention is shown in the accompanying one sheet of drawings, in which:

Figure 1 is an elevational detail of a driving means and shaft and pulleys of a driven mechanism, with the invention being shown in connection therewith, and with the same being used as a drive belt tightening means.

Figure 2 is an elevational detail similar to that shown in Figure 1, but showing the invention as in power throw-off condition.

Figure 3 is a top plan view, taken on line 3—3 of Figure 2.

Figure 4 is a detail vertical section detail, taken on line 4—4 of Figure 2.

Like characters of reference designate like parts throughout the several views.

In order that the advantages and the several features of the invention may be more fully understood and appreciated, we will now take up a detailed description thereof, in which the same will be more fully set forth.

Referring now to the drawings in detail, 1 designates a base member upon which the motor 2 is secured. 3 designates a portion of a mechanism to which power is supplied through the medium of belt 4 which runs over pulley 5 of the motor, and over pulley 6 of the driven mechanism. It will be noted that, in the drawings, speed change types of pulley are shown. However, the device is equally applicable to single groove pulleys.

A lever 7 is pivotally secured to a boss portion 8 of the base by means of screw 9, as more clearly shown in Figure 4. Lever 7 has a roller-carrying arm 10 formed thereon, and which carries belt-engaging rollers 11. An arcuate-shaped arm 12 is carried by the lever 7, with the same being secured thereto by means of screws 13, or by other suitable means. A portion of arm 12 is concentric with relation to pulleys 6 when the same is in braking relation with brake drum 20 which is secured on shaft 21 of the driven mechanism and with the brake drum being mounted on the shaft 21 exteriorly of pulley 6. The concentric portion of arm 12 is provided with a brake lining member 14, with the same being adapted to be brought into engagement with brake drum 20 when the lever is in braking relation with the drum. A belt-engaging pin 15 is carried by the end portion of arm 12, with the pin being adapted to engage belt 4 when lever 7 is moved from belt-tightening position.

Lever 7 has indentations 16 and 17 formed in the lower portion thereof and in concentric relation with screw 9. The indentations 16 and 17 are each adapted to engage ball member 18 which is in spring-urged relation with the under side of lever 7, and with compression spring 19 providing engaging pressure to the ball member. Ball member 18 is adapted to engage indentation 16 when the lever is in belt-tightening position as shown in Figure 1. The ball member 18 is adapted to engage indentation 17 when the lever 7 is in braking position, as shown in Figure 2. Spring 19 exerts sufficient pressure against ball member 18 to maintain lever 7 in either of its respective positions in the normal operation of the driven mechanism.

Operation

Under normal operating conditions, the driven mechanism is operated by means of the motor 2 and with transmission being provided by the belt 4 running over pulleys 5 and 6, with lever 7 being in the position as shown in Figure 1, and with the lever being maintained in belt-tightening relation by means of the contacting relation of ball 18 with indentation 16. The respective roller 11 is engaged with the belt 4 and provides engaging and tightening contact of the belt with relation to the pulleys 5 and 6 and transmitting power from the motor pulley to the pulley of the driven mechanism.

When it is desired to stop the motion of the driven mechanism momentarily, lever 7 is moved manually from the position shown in Figure 1 to the position shown in Figure 2, whereupon brake lining 14 is brought into engagement with brake drum 20. As lever 7 is moved from the position shown in Figure 1 to that shown in Figure 2, pressure of respective roller 11 against belt 4 is released, and with the movement of lever 7 from the engaged to the disengaged position bringing pin 15 into engagement with belt 4. Further movement of lever 7 brings brake lining 14 into braking relation with brake drum 20, as shown in Figure 2, and with ball member 18 being in register with indentation 17. It will be noted, by referring to Figure 2, that engagement of pin 15 with belt 4 cramps the belt, and with the release of pressure normally applied to the belt by the respective roller member 11, causes the belt to become full and out of engaging contact with relation to its respective groove in pulley 5, and permitting pulley 5 to run freely without transmitting power to belt 4.

During normal operation of the driven mechanism, should the mechanism become overloaded, either gradually or suddenly, more than normal tension is exerted on the lower run of the belt from pulley 6 to pulley 5. The more than normal tension causes downward pressure on arm 10 through the engagement of a roller 11 with belt 4, and with the more than normal downward pressure causing disengagement of ball 18 with indentation 16, and with the further pressure downwardly of the belt against the respective roller 11 causing pin 15 to be brought into engaging contact with the upper run of belt 4, as shown in Figure 2. Immediately upon contact of pin 15 with belt 4, the belt becomes full and is freed of its contact with the groove in pulley 5, and permitting the free running of the motor 2 without power therefrom being transmitted to pulley 6. After the cause of overloading has been removed from the driven mechanism, the lever is again brought to the position shown in Figure 1, with the driven mechanism being driven in the normal manner.

The automatic release feature of the invention provides means whereby a single operator may tend a number of machines without it being necessary for the operator to be confined to a single machine. The automatic throw-out feature of the invention also provides assurance against the overloading of the driven mechanism causing damage to the driving motor by instantly releasing the load therefrom should the driven mechanism become overloaded.

Although the preferred embodiment of the invention is shown and described, it is desired, and is to be understood that minor changes may be made in the same, insofar as the changes therein may fall within the scope of the appended claims.

Having now shown and described the invention, what we desire to secure by Letters Patent of the United States, is:

1. In combination with a driving means and a driven mechanism, a belt extending therebetween and adapted to transmit power from the driving means to the driven mechanism, an automatic safety throw-off comprising a pivotally-mounted lever, a roller-carrying arm formed on the lever, a roller carried by said arm with the roller being adapted to engage the belt and to normally provide a tightening means therefor, a second arm secured to the lever, a pin secured into and extending from the second arm, with increased tension of the belt over the roller moving the lever from belt-tightening position, with the pin carried by the second arm engaging the belt and freeing the belt from its driving means, and a spring-urged ball member adapted to engage the pivotally-mounted lever in each of the belt-engaged and belt-disengaged positions.

2. In combination with a driving means and a driven mechanism, a belt transmitting power from the driving means to the driven mechanism, an automatic safety throw-off means, said throw-off means being composed of a pivotally secured lever having a member thereof contacting the belt member and providing tension thereto, an arm secured to the lever with the arm carrying a pin in engageable relation with the belt, with undue tension of the belt pivotally moving the lever from its tension relation with the belt and bringing the pin of the arm member into engagement with the belt with the engagement of the belt by the pin freeing the belt from engaging contact with the driving means, and a spring-urged ball adapted to engage sockets formed in the pivotally secured lever in the engaged and the disengaged positions of the pivotally secured lever.

EVERETT M. BARNES.
CLARENCE E. BARNES.

REFERENCES CITED

The following references are of record in the file of this patent:

UNITED STATES PATENTS

| Number | Name | Date |
|---|---|---|
| 429,877 | Anderson | June 10, 1890 |
| 932,000 | Cressman | Aug. 24, 1909 |
| 1,257,660 | Willis | Feb. 26, 1918 |
| 2,272,981 | Nelson | Feb. 10, 1942 |